United States Patent [19]

Pearson

[11] 4,000,643
[45] Jan. 4, 1977

[54] APPARATUS FOR PRODUCING A COMPENSATING VOLTAGE

[75] Inventor: Robert P. Pearson, St. Paul, Minn.

[73] Assignee: Honeywell Inc., Minneapolis, Minn.

[22] Filed: Mar. 29, 1976

[21] Appl. No.: 671,650

[52] U.S. Cl. .................. 73/88.5 R; 73/88.5 SD; 73/393
[51] Int. Cl.² .................. G01B 7/00; G01L 9/00
[58] Field of Search ............ 73/88.5 R, 88.5 SD, 73/393, 497

[56] References Cited
UNITED STATES PATENTS 3,841,150  10/1974  Pearson ................. 73/88.5 R
3,956,927  5/1976  Pearson ................. 73/88.5 SD Primary Examiner—Jerry W. Myracle
Assistant Examiner—Anthony V. Ciarlante
Attorney, Agent, or Firm—Roger W. Jensen

[57] ABSTRACT

The disclosure describes circuitry for obtaining a compensating voltage signal for a device which is subject to errors caused by changes in a parameter such as ambient temperature. An operational amplifier produces an output voltage at an output thereof indicative of the changes in the parameter. A first and second plurality of series connected resistors are connected between said output and a pair of constant current sources whereby unidirectional electric currents flow through the resistors, junctions being defined between said series connected resistors. Output operational amplifier means are provided, having an inverting input means, a non-inverting input means, and output means at which the compensating voltage is developed. The non-inverting input means is connected to one of the junctions through a series connected resistor and diode, and the inverting input means is connected to another of the junctions through a series connected resistor and diode. Additional resistor/diode elements may be connected between other junctions, and the inverting and/or non-inverting input means to further shape the output compensating voltage.

9 Claims, 3 Drawing Figures

4,000,643

APPARATUS FOR PRODUCING A COMPENSATING VOLTAGE

BACKGROUND OF THE INVENTION

This invention pertains generally to an apparatus for producing a compensating voltage in response to or as a function of changes in a parameter. A specific example described herein is an apparatus for producing a compensating voltage for a device in response to changes in the temperature environment parameter of said device.

This invention may be advantageously used, for example, to provide a compensating voltage for a strain gauge pressure transducer such as that shown in U.S. Pat. No. 3,841,150 issued Oct. 15, 1974, to the same inventor and assigned to the same assignee as the present application. U.S. Pat. No. 3,841,150 discloses a circuit which, inter alia, provides a correction for a temperature related error of the device.

SUMMARY OF THE INVENTION

The present invention is an improvement over the temperature compensating means disclosed in said U.S. Pat. No. 3,841,150. In the present invention a compensating voltage can be produced with less complexity than that in U.S. Pat. No. 3,841,150. The present arrangement offers greater flexibility and permits tailoring an output compensating voltage to a very complex desired correction with relative ease and simplicity; hence, the present invention has the advantages of economy and simplicity.

DESCRIPTION OF THE PREFERRED EMBODIMENT

Figure 1:
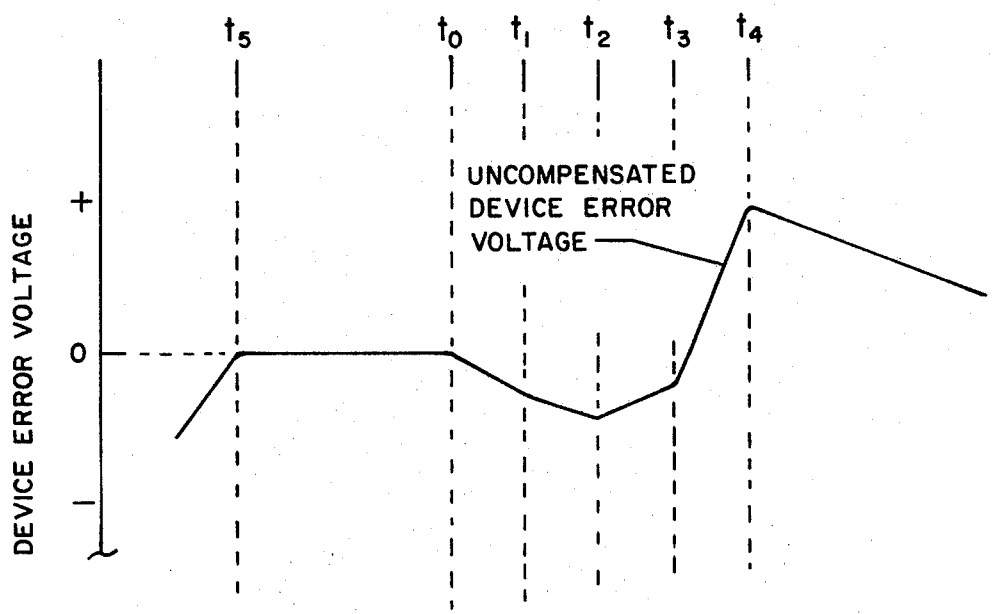
FIG. 1 is a graph of an uncompensated device error signal with voltage being plotted on the Y axis as a function of the ambient temperature plotted on the X axis.
Figure 2:
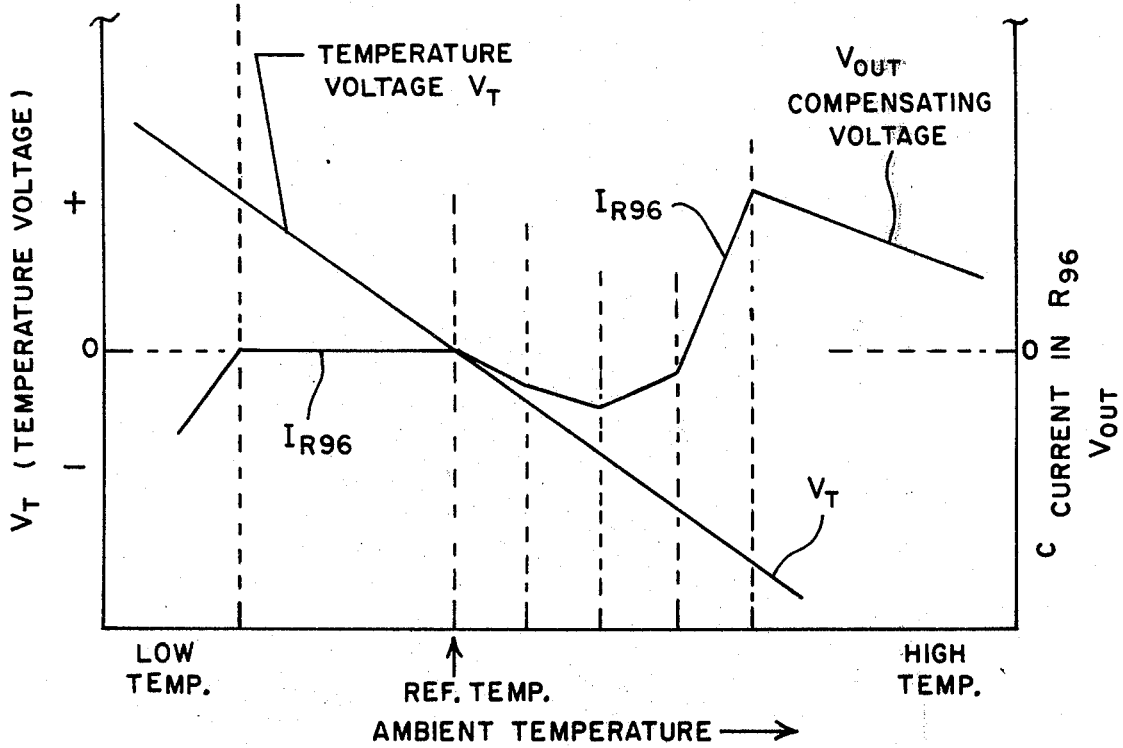
FIG. 2 is a graph showing (i) the compensating current flowing in the feedback resistor 96 of the output operational amplifier means shown in FIG. 3, which current curve is also representative of the compensating voltage signal, current and voltage being plotted on the Y axis as a function of ambient temperature plotted on the X axis, and (ii) the temperature voltage $V_t$ at the output 13 of the amplifier 10 of FIG. 3 as a function of ambient temperature.

Referring to FIGS. 1 and 2, it will be noted that both figures have a common X axis showing variation in ambient temperature. FIG. 1, as indicated, depicts a representative error voltage for a device. An example would be the null error voltage of a strain gauge pressure transducer which data can be obtained by measuring the output voltage from the bridge in which the pressure transducer is used while maintaining pressure constant and varying the ambient temperature. In the example depicted in FIG. 1, there is zero error voltage at a reference temperature $t_0$. As the ambient temperature increases from the reference temperature $t_0$, the error voltage first swings negative and then goes positive, with major changes in the slope of the curve being noted at temperatures $t_1$, $t_2$, $t_3$, and $t_4$, all depicted on the figure. Further, for this example, there is zero error between the reference temperature $t_0$ and a lower temperature $t_5$ but at temperature $t_5$ the error voltage goes negative as the temperature is further reduced.

Figure 3:
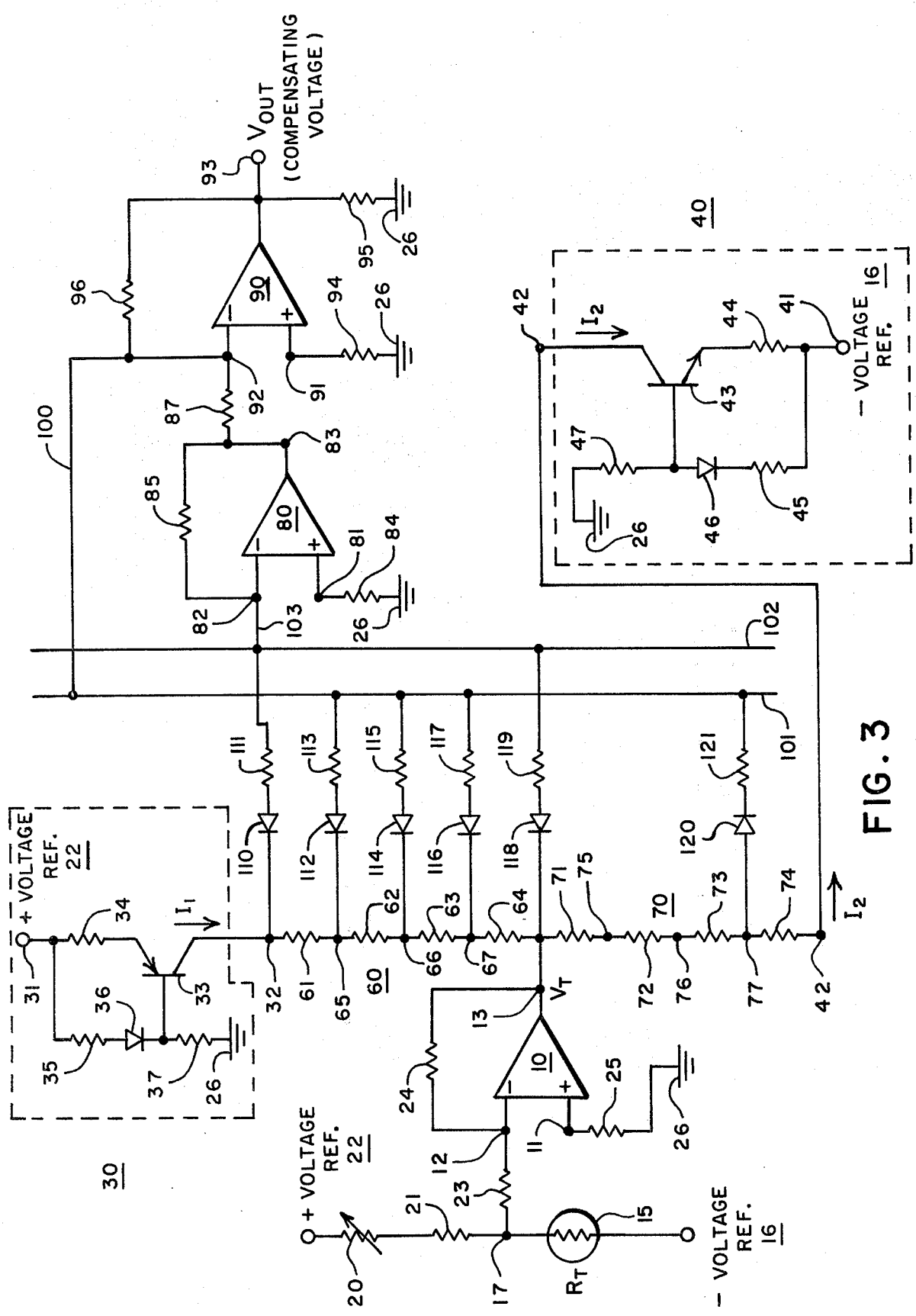
FIG. 3 is an electrical schematic diagram of a preferred form of the circuitry for producing the compensating voltage depicted in FIG. 2.

In FIG. 3, the apparatus for producing a compensating voltage comprises a first operational amplifier 10 comprising a first non-inverting input 11, a first inverting input 12, and an output 13. Operational amplifier 10 may be a conventional operational amplifier such as a MICRO A741.

A means is provided to be responsive to the ambient temperature parameter for producing an output voltage indicative of changes in the temperature parameter. More specifically, this means comprises a temperature sensitive resistor 15 which, for this example, has a positive coefficient of resistance and which responds to the ambient temperature for the device which is to be compensated. Resistor 15 is connected between a negative voltage reference 16 and a junction 17. An adjustable resistor 20 and a fixed resistor 21 are connected in series between junction 17 and a positive voltage reference 22. At the reference ambient temperature $t_0$ the variable resistor 20 may be adjusted so that the voltage at junction 17 is zero. As the ambient temperature increases above the reference temperature $t_0$, then the voltage at junction 17 will become positive and conversely for ambient temperatures below the reference temperature, the voltage at junction 17 will become negative. A resistance 23 provides a connection means for applying the output voltage to the inverting input 12 of operational amplifier 10. A feedback resistor 24 couples the output 13 of amplifier 10 to its inverting input 12 in the known manner. The operational amplifier 10 further includes a resistor 25 connected between its non-inverting input 11 and ground 26; i.e., a current sink having a predetermined voltage. Operational amplifier 10 therefor functions to produce at its output 13 a temperature voltage $V_t$ which will be proportional to the magnitude of the voltage at junction 17 but which is opposite in sign or polarity due to the inverting function of the amplifier 10.

Thus, $V_t$ will be negative (with reference to ground potential) for ambient temperatures above $t_0$ and will be positive for ambient temperartures below $t_0$.

The apparatus of FIG. 3 further comprises a first source of constant current 30 having an input 31 and an output 32; and a second source of constant current 40 comprising an input 41 and an output 42. The constant current source 30 comprises a PNP transistor 33 having its emitter connected to input 31 through a resistor 34 and its collector connected to output 32. The base of transistor 33 is connected to input 31 through a series connected resistor 35 and a diode 36, the anode of the diode being connected to the base of the transistor 33. The base of transistor 33 is further connected to ground 26 through a resistor 37. Constant current source 30 has positive voltage reference 22 applied to input 31 and functions to produce a constant current $I_1$ out of output 32.

The constant current source 40 comprises an NPN transistor 43 having its emitter connected to input 41 through a resistor 44 and its collector connected to output 42. The base of transistor 43 is connected to input 41 through a series connected resistor 45 and a diode 46, the cathode of the diode being connected to the base of the transistor 43. The base of transistor 43 is further connected to ground 26 through a resistor 47.

Constant current source 40 has negative voltage reference 16 applied to input 41 and functions to produce a constant current $I_2$ into output 42.

Reference numeral 60 designates a first plurality of series connected resistors 61, 62, 63 and 64 defining junctions 65, 66 and 67 therebetween. The first plurality of series connected is 60 are connected between the output 32 of the first source of constant current 30 and the output 13 of operational amplifier 10. As indicated, the first source of constant current 30 has the positive reference voltage 22 applied to the input 31 thereof so that constant current $I_1$ flows from output 32 to output 13 of amplifier 10.

Reference numeral 70 designates a second plurality of series connected resistors 71, 72, 73 and 74, which define therebetween junctions 75, 76, and 77. The second plurality of series connected resistors 70 is connected between the output 13 of operational amplifier 10 and the output 42 of the constant current source 40, the input 41 of which, as indicated, is energized by the negative voltage reference 16 so as to produce a constant current $I_2$ which flows from output 13 of amplifier 10 to output 42 of the constant current source 40.

The apparatus of FIG. 3 further comprises a second operational amplifier 80, having a non-inverting input 81, an inverting input 82, and an output 83. Non-inverting input 81 is connected through a resistor 84 to ground 26. A feedback resistor 85 connects output 83 to inverting input 82. The output 83 is connected through a resistor 87 to the inverting input 92 of a third operational amplifier 90, having a non-inverting input 91 connected to ground 26 through a resistor 94 and an output 93 connected to ground 26 through a resistor 95 and connected through a feedback resistor 96 to the inverting input 92. Inverting input 92 is also connected through a lead 100 to a first summing bus 101. A second summing bus 102 is connected through a lead 103 to the inverting input 82 of the second operational amplifier 80.

Amplifiers 80 and 90 are conventional such as MICRO A741 and, as connected together, constitute an output operational amplifier means, the inverting input means of which is input 92 of amplifier 90 and the non-inverting input means of which is input 82 of the amplifier 80.

A plurality of series connected resistors and diodes are selectively connected between summing buses 101 and 102 and the junctions between the resistors 61-64 and 71-74 and the terminals or outputs 13, 32, and 42 of amplifier 10, and constant current sources 30 and 40. Thus, diode 110 and resistor 111 are connected in a series between bus 102 and output 32 of constant current source 30 to which is connected one end of resistor 61. Series connected diode 112 and resistor 113 are connected between bus 101 and junction 65. Series connected diode 114 and resistor 115 are connected between bus 101 and junction 66. Series connected diode 116 and resistor 117 are connected between bus 101 and junction 67. Series connected diode 118 and resistor 119 are connected between bus 102 and output 13 of operational amplifier 10. Series connected diode 120 and resistor 121 are connected between bus 101 and junction 77. It will be noted that diodes 110, 112, 114, 116 and 118 are connected with the anodes thereof to the junctions 32, 65, 66, 67 and 13 respectively. Diode 120 is connected with the cathode thereof to junction 77. If additional diodes were connected to junctions 75, 76 and 42, they also would have the cathodes thereof connected to said junctions.

In operation, the variable resistor 20 is adjusted so that at a reference temperature $t_0$ the voltage at junction 17 is zero and, hence, the voltage at output 13 of operational amplifier 10 is likewise zero. As explained above, as the ambient temperature increases from the reference temperature the voltage output at output 13 will become proportionately more negative. As the ambient temperature is reduced, then the voltage at output 13 becomes more positive. As indicated, the constant currents $I_1$ and $I_2$ flow respectively through the resistor networks 60 and 70; these currents may be identical, but need not be; any difference between currents $I_1$ and $I_2$ being accommodated or sinked by the operational amplifier 10. The resistors 61–64 and 71–74 are selected with two criteria in mind. First of all, they individually are relatively small in size in comparison to the size or resistance of resistors 111, 113, 115, 117, 119 and 121. Thus, for example, the individual resistors 61–64 and 71–74 could be in the range of 100 ohms to 1,000 ohms and the resistors 111, 113, 115, 117, 119 and 121 could be in the range of 100 K ohms to 1 Meg ohm. If this ratio of the resistances is kept relatively high, say in the neighborhood of 100 to 1, then there will be relatively little error introduced in the voltage levels at the junction points 65–67 and 75–77 as a result of currents flowing through the coupling resistors 111, 113, 115, 117, 119 and 121. Secondly, the resistors 61–64 and 71–74 are selected of a size so that the voltages produced at junctions 67, 66, 65, 32 and 77 (as a result of the flow therethrough of the constant currents $I_1$ and $I_2$) will respectively correspond in magnitude (but of opposite polarity) to the magnitude of the output voltage $V_t$ for the various temperatures $t_1$–$t_5$ depicted in FIGS. 1 and 2; i.e., the temperatures at which the device error voltage curve has a significant change or break in slope. In the apparatus depicted in the schematic of FIG. 3, it may be assumed (for convenience in understanding the operation thereof) that resistors 61–64 and 71–74 are all equal in size and that currents $I_1$ and $I_2$ are equal. Thus, equal voltage drops will appear across resistors 61–64 and 71–74 due to the flow therethrough of currents $I_1$ and $I_2$. When the voltage $V_t$ at output 13 of amplifier 10 is zero, the voltages at junctions 32, 67, 66 and 65 will be positive with respect to ground and the voltages at junctions 75, 76, 77, and 42 will be negative with respect to ground. At this time, diodes 110, 112, 114, and 116 are reverse or back-biased because their respective anodes are connected to junctions which are at a positive voltage. Further, diode 120 is back-biased because its cathode is connected to a junction which is at this time negative.

As the voltage $V_t$ at output 13 begins to increase in magnitude in a negative sense (thus being indicative of an increase in ambient temperature above the reference temperature), diode 118 becomes forward biased and current begins to flow through resistor 119 to output 13 of operational amplifier 10 as a result of the voltage $V_t$ being applied to bus 102 and thus to the inverting input 82 of amplifier 80. The signal at input 82 in turn is amplified and inverted by 80 and is applied to inverting input 92 of amplifier 90 to thus cause a current to flow in feedback resistor 96. This is the current indicated between temperatures $t_0$ and $t_1$ in FIG. 2.

As the negative voltage at output 13 continues to increase in magnitude, the junctions 67, 66 and 65 and 32 will successively or sequentially become negative, so as to sequentially remove the back or reverse biasing on diodes 116, 114, 112, and 110, and to thus cause current flows through resistors 117, 115, 113, and 111 to output 13 to commence sequentially. Diode 116 becomes enabled or is forward biased at a $V_t$ corresponding to a temperature $t_1$. Further, diodes 114, 112, and 110 become forward biased at temperatures $t_2$, $t_3$ and $t_4$ respectively. As each of the diodes is enabled, then the current flowing therethrough affects the current flowing through the feedback resistor 96 of the third or output operational amplifier 90.

Since coupling resistors 119 and 111 are connected to bus 102 and are thus connected to the inverting input 82 of operational amplifier 80 and since coupling resistors 113, 115 and 117 are connected to bus 101 and are hence connected to inverting input 92 of operational amplifier 90 it will be understood by those skilled in the art that the effect of negative voltages applied at junctions 13 and 32 will have one effect on current flow through feedback resistor 96 while negative voltages at junctions 67, 66 and 65 will have the opposite effect on current flow through feedback resistor 96. More specifically, when $V_t$ is negative and increasing in magnitude, then i. negative voltages are sequentially coupled by resistors 115, 113, and 111 to bus 101 (after diodes 116, 114 and 112 are enabled) so as to cause current flow in feedback resistor 96 from right to left as viewed in FIG. 3 (defined as positive current flow) and to produce a positive output voltage at output 93; and ii. negative voltages are sequentially coupled by resistors 119 and 111 to bus 102 (after diodes 118 and 110 are enabled) so as to cause negative current flow in resistor 96 and a negative output voltage at output 93.

It will be further understood that when temperature voltage $V_t$ is negative and increasing in magnitude, then the positive back biasing of diode 120 is increased and, hence, no current flows through resistor 121.

Further, it will be understood that as the temperature voltage $V_t$ changes either in a negative or a positive direction that the total voltage drops across resistive networks 60 and 70 will remain substantially the same due to the flow therethrough of the constant currents $I_1$ and $I_2$, the currents flowing therethrough derived from currents flowing through resistors 117, 115, 113, 111, and 121 being relatively small and thus of slight significance in setting the total voltage drop across the network 60 and 70. However, while the total voltage drops across 60 and 70 remains substantially constant, it is seen that the potential (with respect to ground 26) at the junctions 32, 65–67, 13, 75–77, and 42 shifts directly in proportion to the temperature voltage $V_t$ at output 13. This is the key to the selective enabling of diodes 118, 116, 114, 112, and 110 (where $V_t$ is negative) and of diode 120 )when $V_t$ is positive).

It is seen, therefore, that at each of the increasing temperatures $t_1$, $t_2$, and $t_3$ and $t_4$ the net current flow through feedback resistor 96 is affected by the signals being coupled to buses 101 and 102 (and thus to input 92 of the amplifier 90 and to input 82 of amplifier 80) by the respective enabling of diodes 116, 114, 112 and 110. Thus, between $t_0$ and $t_1$, $I_{R96}$ is a negative current determined by the magnitude of $V_t$ appearing at output 13 and the size of coupling resistor 119. See FIG. 2. Between $t_1$ and $t_2$ (when diode 116 first becomes enabled), the net current $I_{R96}$ is the resultant of a negative current effect of the voltage appearing at output 13 and a positive current effect of the voltage appearing at junction 67, the magnitude of the positive current effect being determined by the size of resistor 117 and the magnitude of the negative voltage at junction 67. Thus, in FIG. 2, it will be noted that the current $I_{R96}$ between $t_1$ and $t_2$ continues to increase in a negative direction, but at a slope which is less steep than the slope thereof between temperatures $t_0$ and $t_1$. It will be understood that the size of resistor 117 was selected to produce the desired slope of current $I_{R96}$ between $t_1$ and $t_2$.

Likewise, between $t_2$ and $t_3$, and between $t_3$ and $t_4$, additional positive current effects (on $I_{R96}$) are caused by the negative voltages appearing at junctions 66 and 65, the size of resistors 115 and 113 being selected to produce the desired slope of current $I_{R96}$ between $t_2$ and $t_3$, and between $t_3$ and $t_4$ respectively. From FIG. 2, it will be noted that the net current $I_{R96}$ changes from negative to positive between $t_3$ and $t_4$.

At temperature $t_4$ another negative current effect (on $I_{R96}$) is caused by the negative voltage appearing at output 32, thus enabling diode 110 for the first time, resistor 111 being selected to produce the desired slope of $I_{R96}$ for temperatures greater than $t_4$.

When the ambient temperature is below the reference temperature $t_0$, then diodes 110, 112, 114 116 and 118 are back-biased and thus prevent current flow from the buses 101 and 102 toward output 13. As the ambient temperature decreases to temperature $t_5$, then the positive back-biasing on diode 120 is removed and thereafter as the ambient temperature decreases further current flow occurs through resistor 121 and through feedback resistor 96 as is clearly depicted on FIG. 2.

To summarize, therefore, the applicant's invention provides a means of producing a compensating voltage signal as a function of a parameter, such as ambient temperature, the invention being especially useful when a complex compensating voltage is required such as to compensate for the error voltage depicted in FIG. 1. It is seen that the net current flowing in feedback resistor 96, $I_{R96}$, is controlled by the magnitude and polarity of the voltages applied to buses 101 and 102 and by the sizes of the coupling resistors 119, 117, etc.

The polarity of the temperature voltage $V_t$ will determine the enabling of the diodes 110, 112, etc. Thus, in the circuit of FIG. 3, for a negative $V_t$ the diodes 118, 116, 114, 112 and 110 are sequentially enabled while diode 120 remains back-biased by a positive potential at junction 77.

The enabling of the diodes is further determined and is selectable to any desired temperature by the selection of the sizes of the resistors in the series connected resistors 60 and 70, regard being given to magnitude of the constant currents $I_1$ and $I_2$ flowing therethrough.

The number of resistors in networks 60 and 70 is variable, the number of junctions being determined by the desired number of corrections for the current $I_{R96}$. If an error curve were complex, having many changes in slope, and it was desired to have the compensating voltage follow the error curve very accurately, then a large number of resistors would be used for networks 60 and 70.

When negative voltages from network 60 are applied (i) to bus 101, then $I_{R96}$ is negative and (ii) to bus 102, then $I_{R96}$ is positive.

The positive voltages from network 70 when applied (i) to bus 101 cause $I_{R96}$ to be positive and (ii) to bus 102 cause $I_{R96}$ to be negative.

Those skilled in the art will recognize that the preferred embodiment of the invention disclosed herein may be altered and modified without departing from the true spirit and scope of the invention as defined in the accompanying claims.

What is claimed is:

1. Apparatus for producing a compensating voltage in response to changes in a parameter comprising in combination:
   a first operational amplifier comprising a first non-inverting input, a first inverting input, and a first output;
   means responsive to a parameter for producing an output voltage indicative of changes in the parameter;
   connection means for applying said output voltage to said first inverting input;
   means connecting said first non-inverting input to a current sink having a predetermined voltage;
   a first source of constant current having an input and an output;
   a first plurality of series connected resistors, junctions being defined between said resistors;
   means connecting said first plurality of resistors between said output of said first source of constant current and said first output, said first source of constant current having a reference voltage applied to the input thereof so that the constant current output thereof flows from the output of said first source toward said first output;
   a second source of constant current having an input and an output;
   a second plurality of series connected resistors, junctions being defined between said resistors;
   means connecting said second plurality of said resistors between said first output and said output of said second source of constant current, said second source of constant current having a reference voltage applied to the input thereof so that the constant current output thereof flows from said first output toward said output of said second source;
   a second operational amplifier comprising a second non-inverting input, a second inverting input and a second output;
   a third operational amplifier comprising a third non-inverting input, a third inverting input, and a third output;
   resistance means connecting said second output to said third inverting input;
   resistance means connecting said second output to said second inverting input;
   resistance means connected between said third output and said third inverting input;
   a resistor and a diode connected in series between said second inverting input and one of said junctions;
   a resistor and a diode connected in series between said third inverting input and another of said junctions; and
   means connecting said second and third noninverting inputs to said current sink.

2. Apparatus as claimed in claim 1 further characterized by said output operational amplifier means comprising:
   a second operational amplifier comprising a second non-inverting input, a second inverting input, and a second output;
   a third operational amplifier comprising a third non-inverting input, a third inverting input, and a third output;
   resistance means connecting said second output to said third inverting input;
   resistance means connecting said second output to said second inverting input;
   resistance means connected between said third output and said third inverting input; and
   means connecting said second and third non-inverting inputs to said current sink;
   whereby said second inverting input constitutes said non-inverting input means of said output amplifier means.

3. Apparatus as claimed in claim 1 and further comprising a resistor and a diode connected between said first output and one of the input means of said output operational amplifier means.

4. Apparatus for producing a compensating voltage in response to changes in a parameter comprising in combination:
   a first operational amplifier comprising a first non-inverting input, a first inverting input, and a first output;
   means responsive to a parameter for producing an output voltage indicative of changes in the parameter;
   connection means for applying said output voltage to said first inverting input;
   means connecting said first non-inverting input to a current sink having a predetermined voltage;
   a first source of constant current having an input and an output;
   a first plurality of series connected resistors, junctions being defined between said resistors;
   means connecting said first plurality of resistors between said output of said first source of constant current and said first output, said first source of constant current having a reference voltage applied to the input thereof so that the constant current output thereof flows from the output of said first source toward said first output;
   a second source of constant current having an input and an output;
   a second plurality of series connected resistors, junctions being defined between said resistors;
   means connecting said second plurality of said resistors between said first output and said output of said second source of constant current, said second source of constant current having a reference voltage applied to the input thereof so that the constant current output thereof flows from said first output toward said output of said second source;
   a source operational amplifier comprising a second non-inverting input, a second inverting input and a second output;
   a third operational amplifier comprising a third non-inverting input, a third inverting input, and a third output;
   resistance means connecting said second output to said third inverting input;

resistance means connecting said second output to said second inverting input;

resistance means connected between said third output and said third inverting input;

a resistor and a diode connected in series between said second inverting input and one of said junctions;

a resistor and a diode connected in series between said third inverting input and another of said junctions; and means connecting said second and third noninverting inputs to said current sink.

5. Apparatus as claimed in claim 4 and further comprising a resistor and a diode connected between said first output and the second inverting input.

6. Apparatus as claimed in claim 4 further characterized by the resistors connected between said junctions and said second and third operational amplifiers being at least 100 times larger in resistance than the resistance of said series connected resistors.

7. Apparatus for producing a compensating voltage in response to changes in a parameter comprising in combination:

first amplifier means comprising a first input, and a first output;

means responsive to a parameter for producing a signal indicative of a function of the parameter;

connection means for applying said signal to said first input, an output signal being produced at said first output indicative of the function of the parameter;

a first source of constant current having an input and an output;

a first plurality of series connected resistors, junctions being defined between said resistors;

means connecting said first plurality of resistors between said output of said first source of constant current and said first output, said first source of constant current having a reference voltage applied to the input thereof so that the constant current output thereof flows from the output of said first source toward said first output;

aa second surface of constant current having an input and an output;

a second plurality of series connected resistors, junctions being defined between said resistors;

means connecting said second plurality of said resistors between said first output and said output of said second source of constant current, said second source of constant current having a reference voltage applied to the input thereof so that the constant current output thereof flows from said first output of said second source;

output operational amplifier means comprising noninverting input means, inverting input means, and a second output;

a resistor and a diode connected in series between a first of said junctions and said inverting input means of said output amplifier means; and a resistor and a diode connected in series between a second of said junctions, and said non-inverting input means of said output amplifier means.

8. Apparatus as claimed in claim 7 and further comprising a resistor and a diode connected between said first output and said non-inverting input means.

9. Apparatus as claimed in claim 7 and further comprising a resistor and a diode connected between said first output and one of the input means of said output operational amplifier means.

* * * * *